United States Patent [19]
Burwell

[11] Patent Number: 4,876,789
[45] Date of Patent: Oct. 31, 1989

[54] APPARATUS FOR MEASURING AND CUTTING SHEETROCK

[76] Inventor: Joseph M. Burwell, 7202 Fairchild Dr., Fairfax, Va. 22306

[21] Appl. No.: 236,881

[22] Filed: Aug. 26, 1988

Related U.S. Application Data

[63] Continuation-in-part of Ser. No. 185,689, Apr. 22, 1988.

[51] Int. Cl.$^4$ .................. B23P 23/00; G01B 5/20
[52] U.S. Cl. ..................... 29/560; 33/1 M; 408/26; 409/127
[58] Field of Search ............ 29/33 R, 560; 33/1 M, 33/503, 504, 505, 675, 526, 527, 528, 556, DIG. 10, 18.1, 549; 144/134 A, 134 B, 134 R, 356, 357; 408/22, 26; 83/71, 453, 565, 925 CC; 409/124, 125, 126, 127

[56] References Cited

U.S. PATENT DOCUMENTS

| | | | |
|---|---|---|---|
| 3,037,760 | 6/1962 | Arnault | 33/1 M |
| 3,200,712 | 8/1965 | Jenkins | 409/127 |
| 3,289,540 | 12/1966 | Bardwell et al. | 409/98 X |
| 3,531,868 | 10/1970 | Stevenson | 33/503 |
| 3,848,490 | 11/1974 | Arel | 83/71 X |
| 4,181,054 | 1/1980 | Striebig | 83/453 X |
| 4,325,188 | 4/1982 | Reinmold et al. | 33/1 M |
| 4,335,986 | 6/1982 | Fahrner | 409/125 |
| 4,713,887 | 12/1987 | Kitamura | 33/18.1 |

FOREIGN PATENT DOCUMENTS 142202 7/1985 Japan ..................... 33/1 M

Primary Examiner—William Briggs
Attorney, Agent, or Firm—A. Robert Theibault

[57] ABSTRACT

The present disclosure is directed to an apparatus for simultaneously measuring and cutting 4×8 panels of sheetrock having a measuring unit which has a stylus supported thereon for both vertical and horizontal movement to trace out the outline from a ceiling or wall of a panel of sheetrock to be cut directly form the wall or ceiling upon which the panel is to be installed. The cutting unit has sawing means mounted thereon for both vertical and horizontal movement positionable over a stack of 4×8 sheetrock panels. Electrical means connects the measuring unit to the cutting unit so that the sawing means on the cutting unit cuts a 4×8 panel of sheetrock both vertically and horizontally simultaneously as outlined by the stylus of the measuring unit outling the area to be paneled.

8 Claims, 13 Drawing Sheets

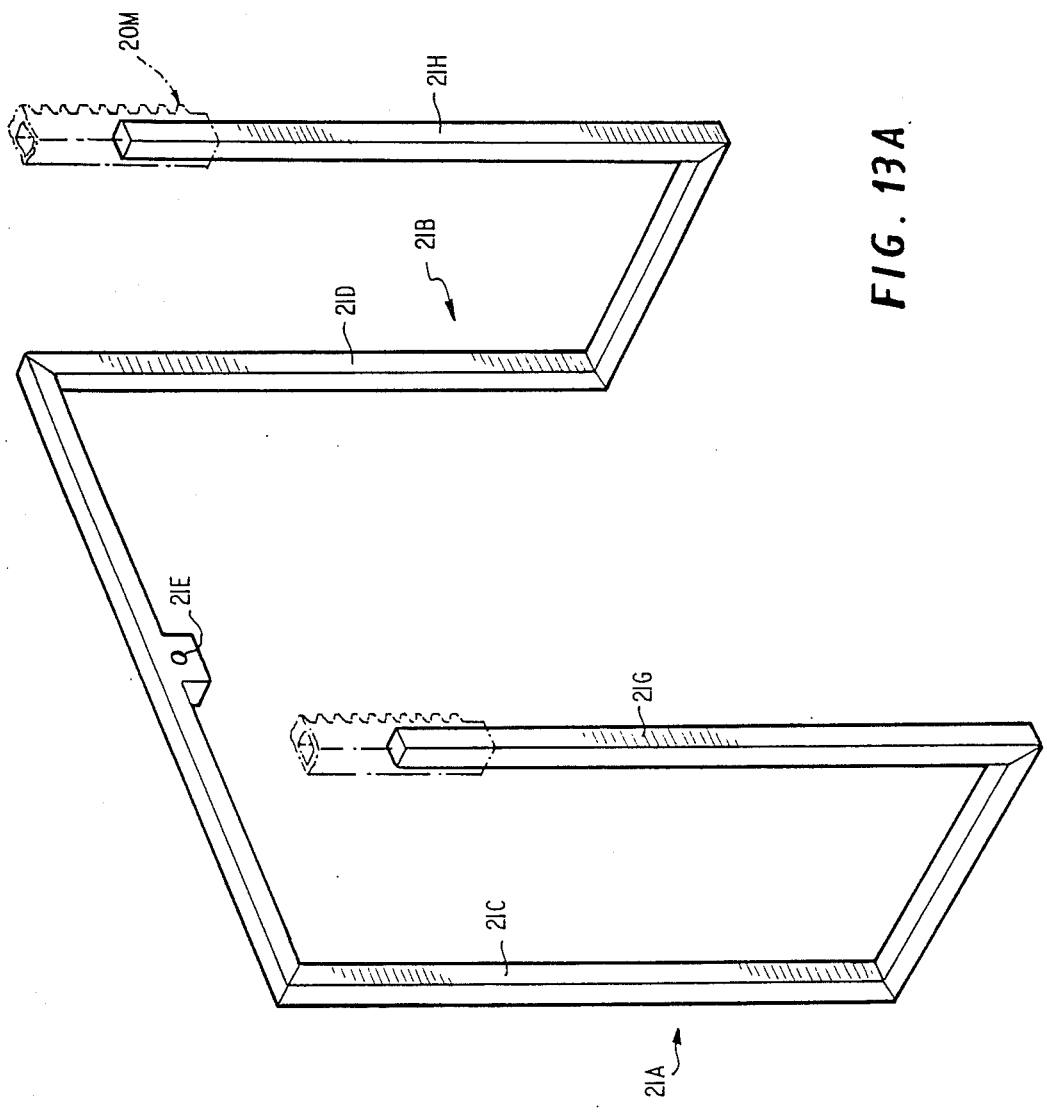

APPARATUS FOR MEASURING AND CUTTING SHEETROCK

The present application is a continuation-in-part of my application Ser. No. 07/185,689, filed Apr. 22, 1988. The present disclosure is directed to an apparatus for cutting standard 4×8 foot sheets of sheetrock or dry wall panels into precisely measured panel units for walls and ceilings of either a residential or commercial property which has been pre-framed with, for example 2×4 studs outlining the rooms, doors, windows, jack studs, sills and cripples as shown in FIG. 1 of U.S. Pat. No. 3,785,060.

Another object of the present invention is to provide an apparatus of the above type which permits measuring and cutting sheetrock for use anywhere on walls or ceilings within an area of 4 feet by 8 feet.

The apparatus has an electrically interlocked measurer and cutter. The frame of the measurer has a primary frame the major axis of which is rectangular and the long sides of which have rack gear teeth which mesh with circular toothed drive gears on a secondary rectangular frame whose major axis is at a right angle to the primary frame causing it to be driven along the primary frame of the measurer to move a measuring stylus carried by the secondary frame of the measurer along the major axis of the measurer while being simultaneously driven transversely along its secondary frame.

The cutter has a primary rectangular frame the long sides of which have gear rack teeth which mesh with toothed gears carried by a secondary rectangular frame so that a cutting saw carried by the secondary frame of the cutter may be moved transversely of the secondary frame as the secondary frame is driven along the major axis of the primary rectangular frame over a vertical stack of sheetrock sheets.

The measurer and cutter are electrically interconnected so that movement of the stylus on the measurer is transposed to instant corresponding movement of the cutting saw on the cutter to cut the sheetrock as outlined by the stylus, to either cut a sheet of sheetrock to length or to cut a sheet to width by cutting the sheet along its longitudinal or major axis to determine the width of a panel.

Another object of the present invention is to employ a single motor driven saw which may be used to cut the panel to both the precise length and width desired.

A further object of the present invention is to provide the secondary frame with a replacement saw or cutter for cutting openings through the sheetrock for electrical outlets or pipe openings for plumbing or electrical conduits.

A still further object of the present invention is to provide two substantially similar units, one a measurer unit M, being an upper open ended unit having an extensible frame composed of two long racks in excess of the length of a standard sheet of 4 foot by 8 foot sheetrock, this being the measuring unit M upon which is carried a secondary frame having a scribe which traverses the long racks to measure directly from the wall or ceiling being measured, the exact vertical and horizontal dimensions of the sheetrock to be cut. The measuring unit must exceed the length of the sheetrock to permit the stylus freedom of movement over the entire length of the sheetrock so that when the stylus is at the upper most position or lower most position in measuring the area of a sheet to be cut it does not cause the stylus of the measuring unit M to be engaged by either end, upper or lower of the primary frame of the measuring unit, which has a primary rectangular frame in excess of the 4 foot by 8 foot dimension of the standard sheet of sheetrock. A secondary rectangular frame is mounted on the primary rectangular measuring frame and is provided with a stylus measurer which measures both vertically and horizontally as dictated by the scribe on the measuring unit.

The cutting unit C has a fixed sided primary rectangular frame over which is carried a secondary rectangular frame. Mounted on the secondary frame is a follower or cutter unit which causes the saws of the cutter unit to follow the measuring motions of the scribe of the measuring unit. The measuring unit M and the cutting unit C may both be in the same construction area or may be in separate rooms because they are too large to be placed in the same room on most residential jobs. The two units, measurer M and the cutter C are electrically connected to have their stylus and cutting saws synchronized so that as a horizontal or vertical measurement is traced by the measuring stylus S a corresponding horizontal or vertical cut on a panel of sheetrock is being made by the saw of the cutting unit C. This is also true of vertical measurements being transposed from stylus to sheetrock.

A stack of sheetrock is placed in a container beneath the cutting unit C positioned to be engaged by the saw of the cutting unit and as each panel of sheetrock is cut the completed sheet is removed from the cutter to position a new 4×8 sheet in position to be indexed upwardly for engagement with the cutting saw of the follower or cutter unit.

BACKGROUND ART

In the art of cutting sheetrock panels for installation in pre-studed areas such as dwellings and office space the best art known to me at the time of filing this application is:

| | | |
|---|---|---|
| 2,529,210 | J. F. BUTLER | 1950 |
| 3,286,351 | R. McALISTER | 1966 |
| 3,565,139 | E. T. OLSON | 1971 |
| 3,785,060 | L. E. BREWER | 1974 |
| 3,890,861 | F. GEBHART | 1975 |
| 3,931,751 | P. A. SIMONSON | 1976 |
| 3,945,285 | F. GEBHART | 1976 |
| 4,181,054 | L. STRIEBIG | 1980 |
| 4,202,231 | L. STRIEBIB | 1980 |

BRIEF DESCRIPTION OF THE DRAWINGS

FIG. 13A is a perspective view of the split U-shaped pivotally mounted vertical forked frames for supporting the toothed hollow gear rack sleeves for telescopic movement to accommodate the measurer and cutter over the maximum length of a sheet of sheetrock in either the wall or ceiling measuring or cutting position.

PREFERRED EMBODIMENT OF THE INVENTION

Figure 1:
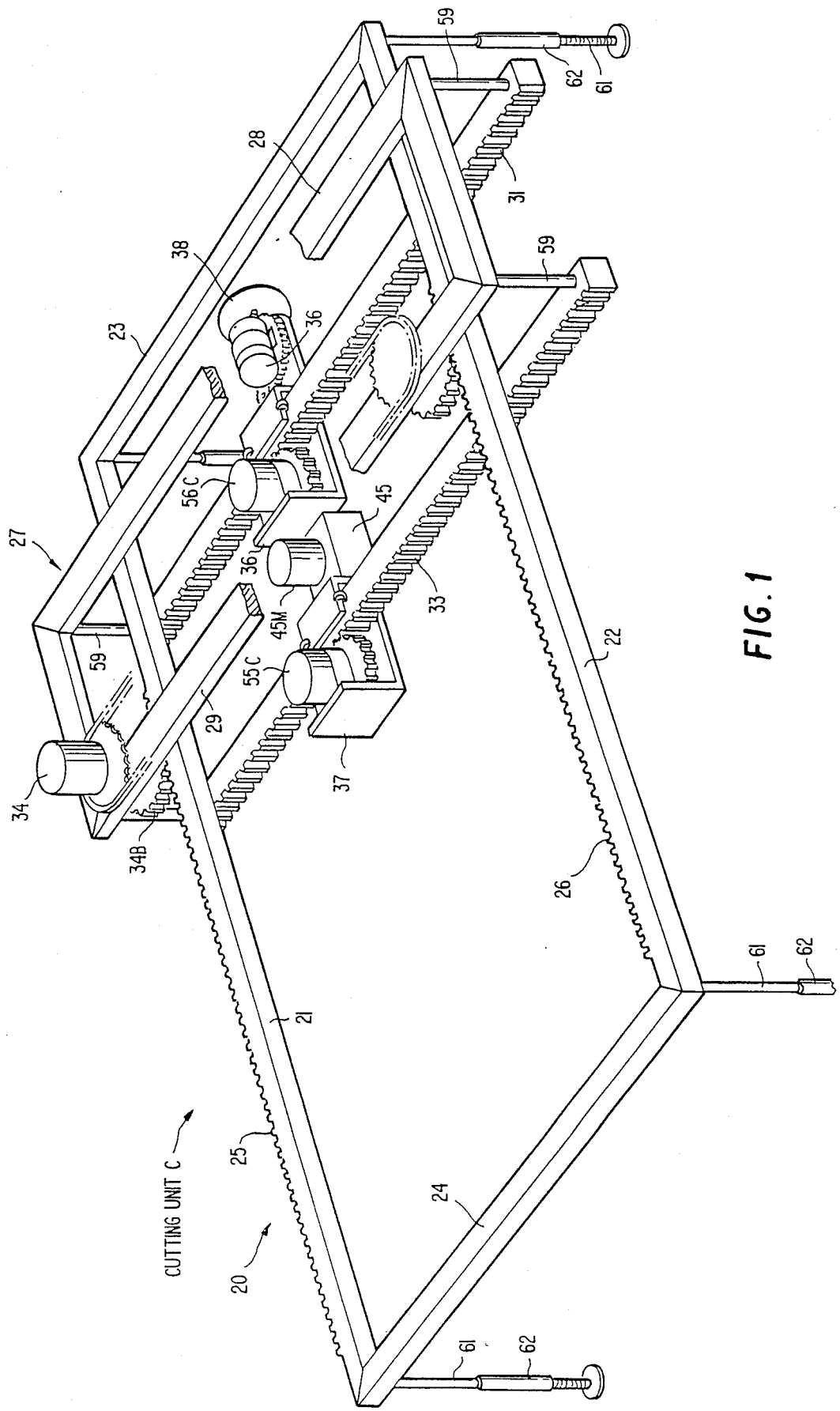
FIG. 1, is a perspective view of the cutting apparatus of the present invention showing the primary and secondary frames and their longitudinal and transverse drive systems.
Figure 2:
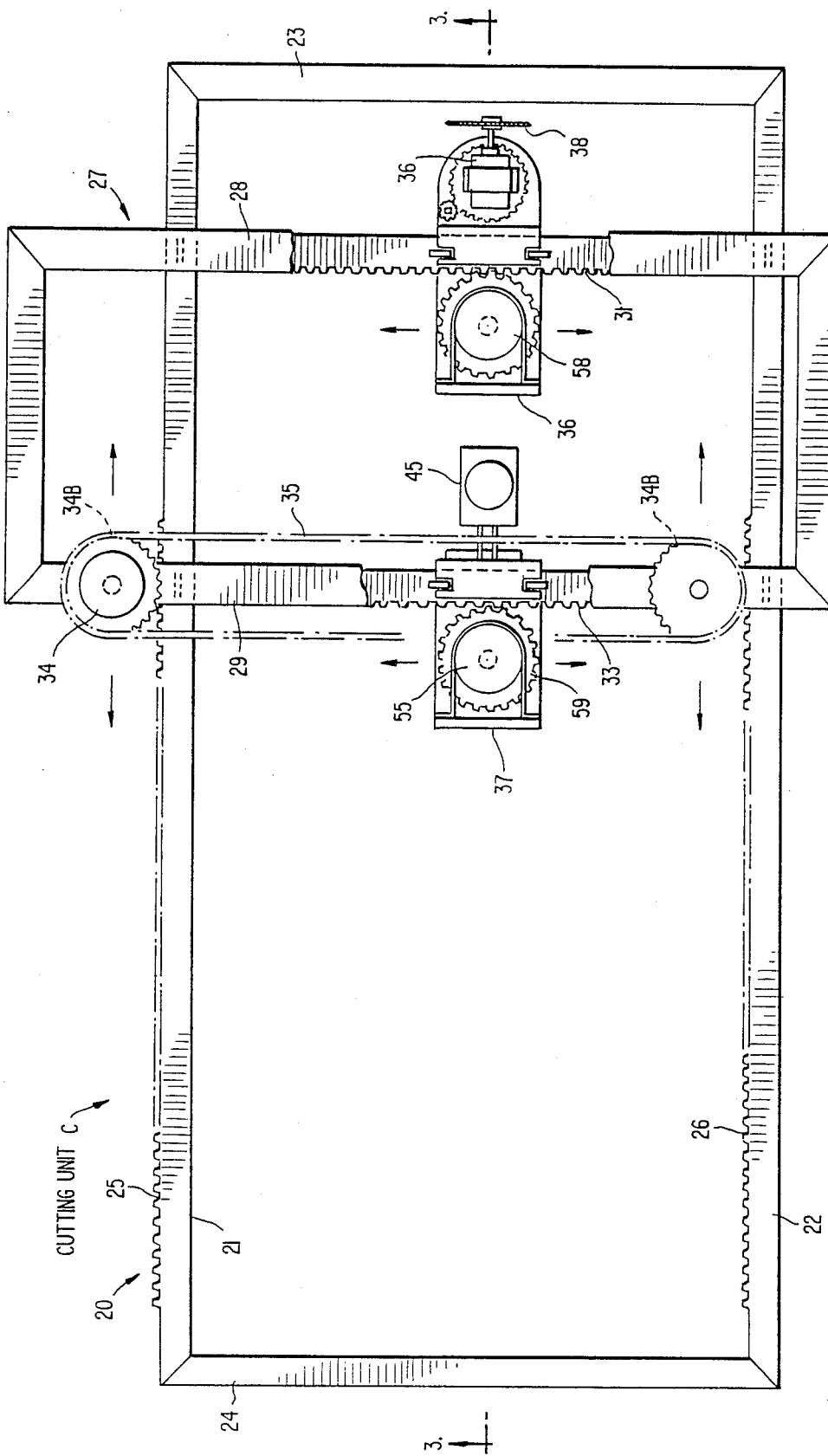
FIG. 2, is a top plan view of the cutting apparatus of FIG. 1, showing the apparatus of FIG. 1 emphasizes that the cutting apparatus carried by the secondary frame rides over and along the major axis of the primary frame.
Figure 3:
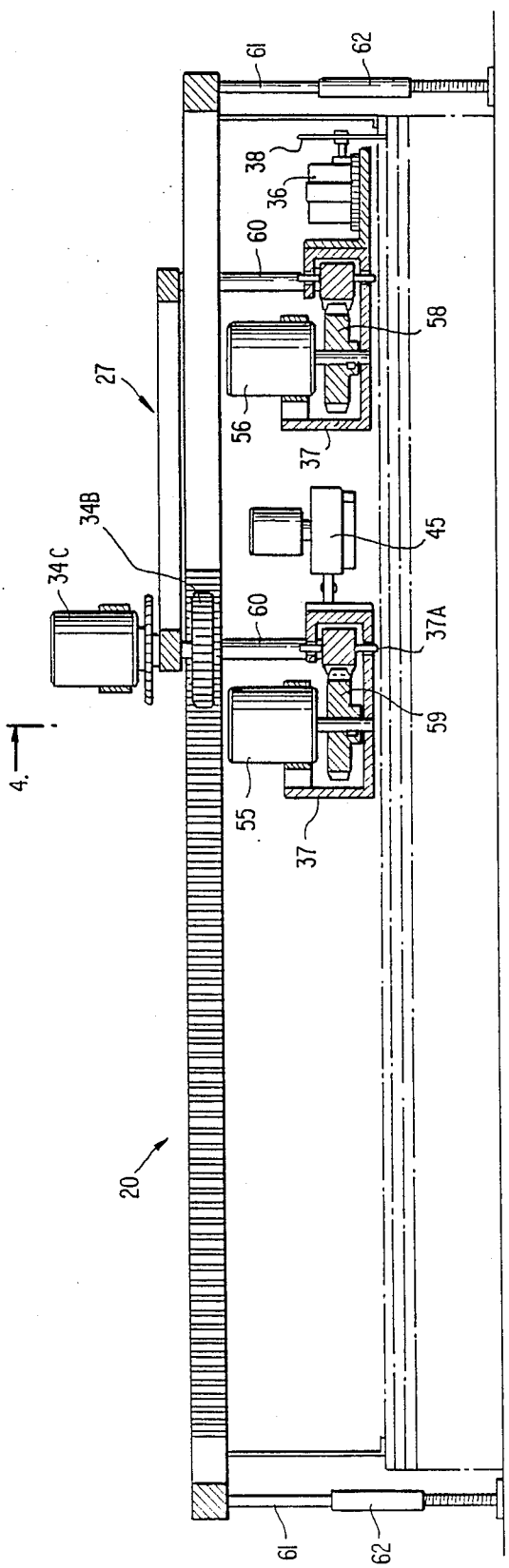
FIG. 3, is a vertical longitudinal section taken on the lines 3—3 in FIG. 2, showing the secondary frame riding on a vertical stack of panels of sheetrock to be cut.

Referring for the moment to FIGS. 1, 2, 3 and 4, 20 designates a primary closed rectangular frame having long sides 21, 22 and short sides 23, 24. The long sides 21, 22 have gear rack teeth 25, 26 along one side thereof. Supported upon the primary frame and rollable along the major axis thereof is a secondary frame 27, also of closed rectangular construction the major and minor axes of which are smaller than the primary frame 20. The long sides 28, 29 of the secondary frame have support racks having teeth 30, 31. An electric motor 34 drives the secondary frame through pinion and rack drive along the primary frame 20. A chain drive 35, is driven by motor 34, to drive the secondary frame 27, at both sides longitudinally of the primary frame 20. As best seen in FIGS. 3, 5 and 6, motor supports 36 and saw supports 37, are mounted on roller supports 37a to roll along the tops of the long sides 28, 29 of the secondary frame 27.

As shown in FIGS. 5 and 6 the flat circular saw blade 38, is driven by motor 36 which is mounted on a circular toothed gear 39 driven by a motor 40 driving pinion 41, which controls the direction of cut of the circular saw blade 38, so that the ends of the sheetrock panels may be cut at a right angle to the longitudinal axis of the primary frame 20 or the rotary axis of the circular saw blade 38, may be rotated to cut the sheetrock panel to the desired width at exactly a right angle to the axis of the transverse cut. This is accomplished by a motor 40, rotating a pinion 41, which changes the axis of orientation of the circular saw blade 38. A shield 42 and vacuum line 43, draws off the dust from the cut of the saw blade 38.

Figure 7:
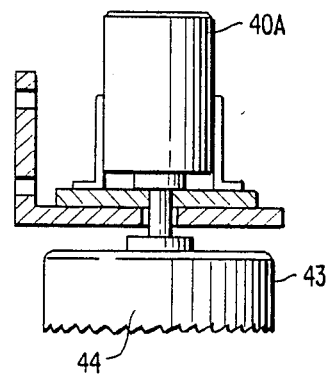
FIG. 7, is a side elevational view with parts broken away and parts shown in section of a sawing device for laying out pipe holes for cutting, plumbing or other openings through a panel of sheetrock.

When cutting through the sheetrock for water pipes, a motor driven cupped shape circular saw 44 may be substituted as shown in FIG. 7 for the electrical outlet saw 45.

Figure 8:
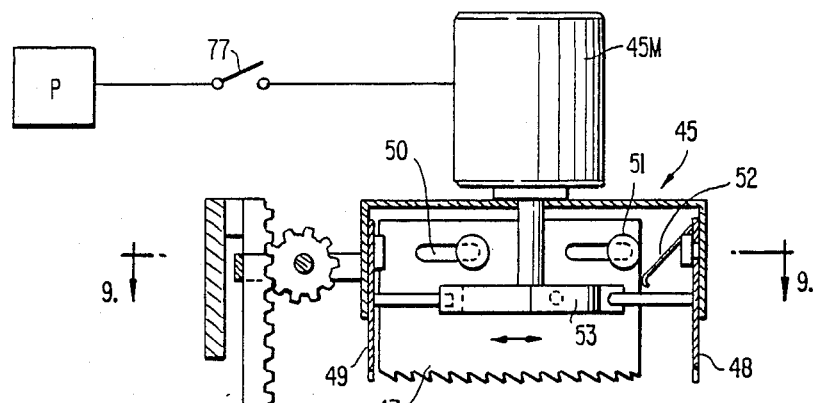
FIG. 8, is a vertical sectional view with parts broken away and parts shown in section of an electrical box outlet cutter employed on the secondary frame of the present invention.
Figure 9:
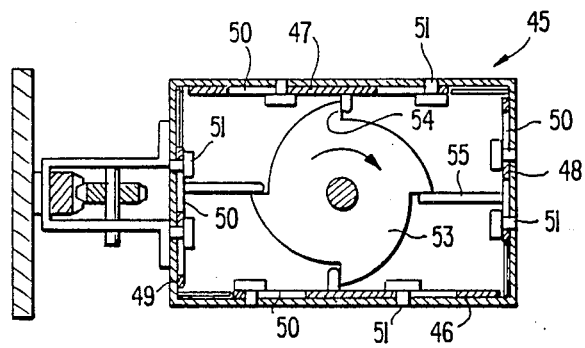
FIG. 9, is a horizontal sectional view of the outlet cutter of FIG. 8.
Figure 10:
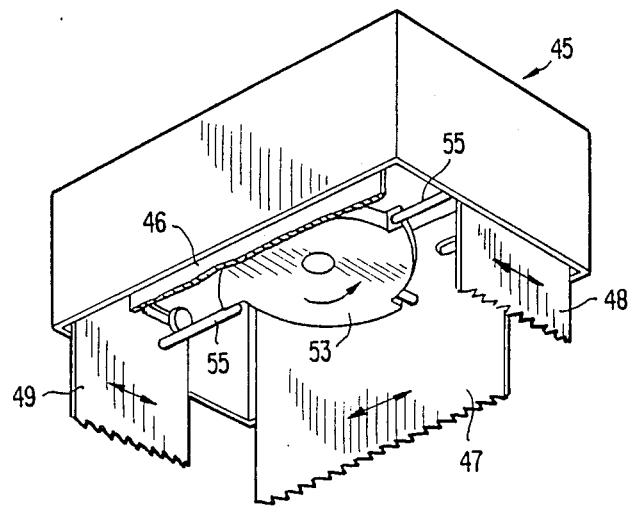
FIG. 10, is a bottom perspective view of the cutter of FIGS. 8 and 9.

As shown in FIGS. 2 and 3, the arm 28 of the secondary frame 27, may carry the cutting blade 38 while arm 29 may carry the electrical outlet box cutting installer 45, shown in FIGS. 8, 9 and 10. The box saw units have four saw blades 46, 47, 48 and 49, having slot mounts 50, so that the blades are supported on pins 51, to permit their reciprocation back and forth by leaf springs 52, actuated by a cam 53, having stepped surfaces 54, which engage rods 55 to reciprocate the blades 46, 47, 48 and 49, to cut out a rectangular opening in the sheetrock panel for an electrical outlet box.

The short sides 28a, 29a join the long sides 28, 29 to form the secondary frame 27.

The drive means for moving the secondary frame 27 relative to the primary frame or along the major axis of the primary frame 20, is a motor 34 driving shaft 34a and pinions 34b, which move the secondary frame 27 along the major axis of the primary frame 20.

Figure 4:
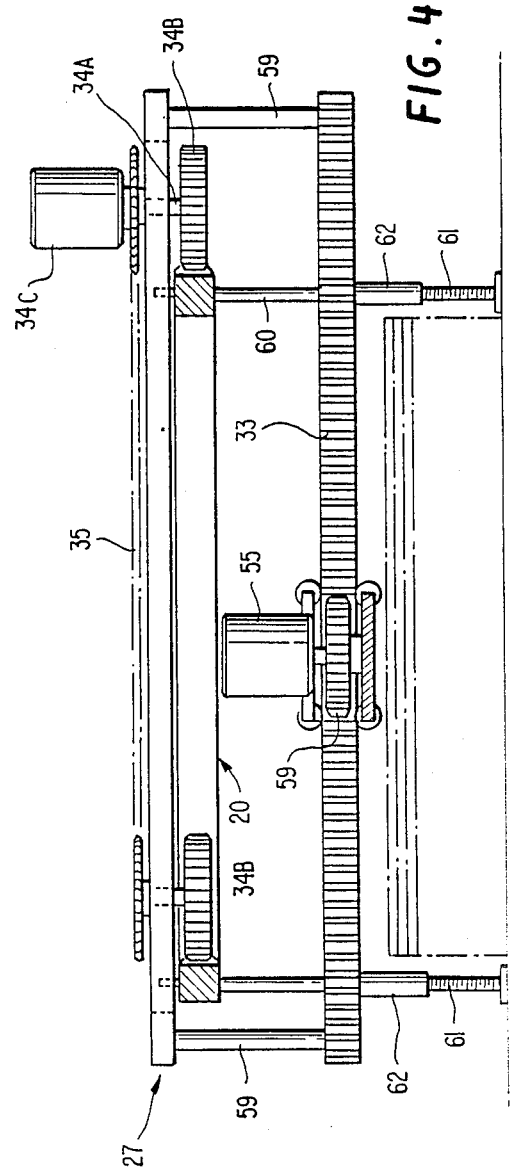
FIG. 4, is a vertical section taken on the lines 4—4 in FIG. 3, showing the driving mechanism for moving the secondary frame along the primary frame passing over vertically stacked panels of sheetrock.
Figure 5:
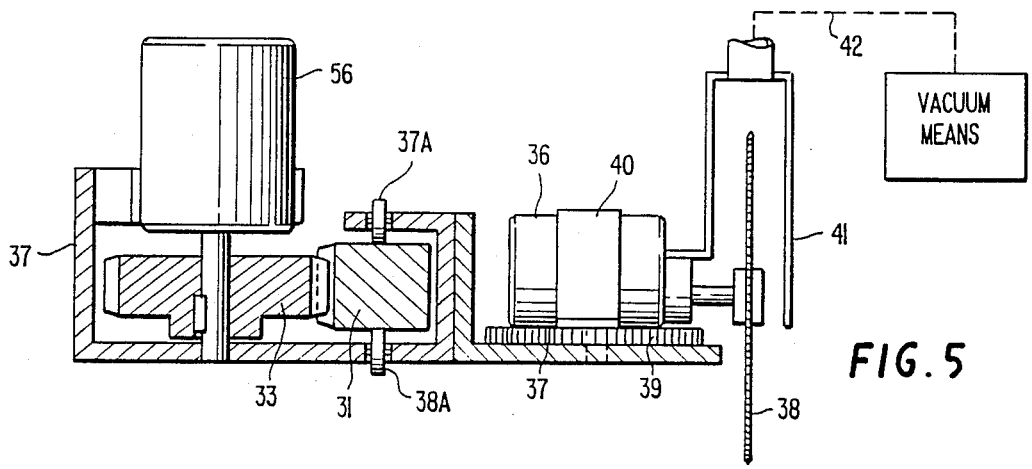
FIG. 5, is a vertical sectional view of the panel sawing device for cutting the length and width of a desired panel.
Figure 6:
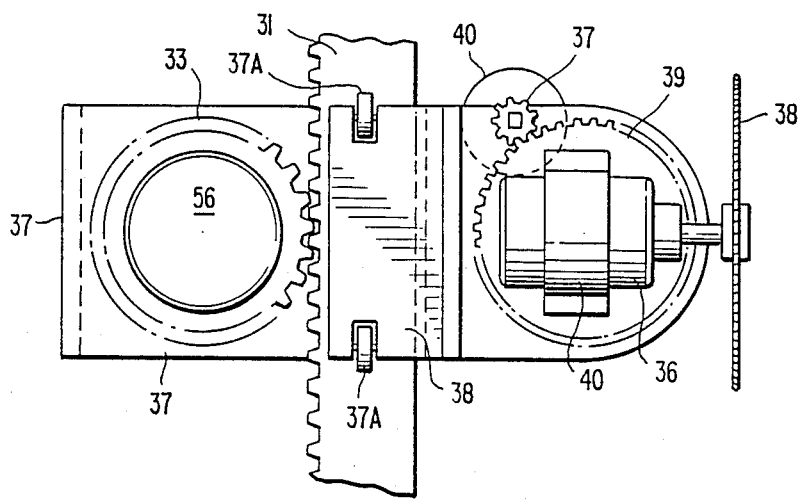
FIG. 6, is a top plan view with parts broken away and parts shown in section of the device of FIG. 5.

Suspended beneath the secondary frame 27, as best seen in FIGS. 4 and 5, are the circular saw cutter 38 and electrical outlet box cutters 45 which are moved transversely of the secondary frame 27 by motors 55, 56, which drive pinions 58, 59 in mesh with the teeth of rack gears 30, 31 secured to the secondary frame 27 by spacer rods 59, one at each of the four corners of the secondary frame 27. The two drive pinions 34b, in mesh with the gear racks 25, 26 of the primary frame are maintained in sync with the chain drive 35, best seen in FIG. 4.

The drive means for moving the circular saw cutter 38 and the electrical outlet box 45, transversely of the primary frame 20 or longitudinally of the secondary frame 27, are the motors 55, 56, which drive pinions 58, 58A, in mesh with gear racks 30, 31 secured to the secondary frame 27, through spacer rods 59.

As best seen in FIGS. 1 and 4 the primary frame 20 of the cutter C is poised over a vertical stack of sheetrock by legs 61 which are threadedly adjustable at 62, to control positioning of the cutting saws relative to the panels of sheetrock.

Figure 14:
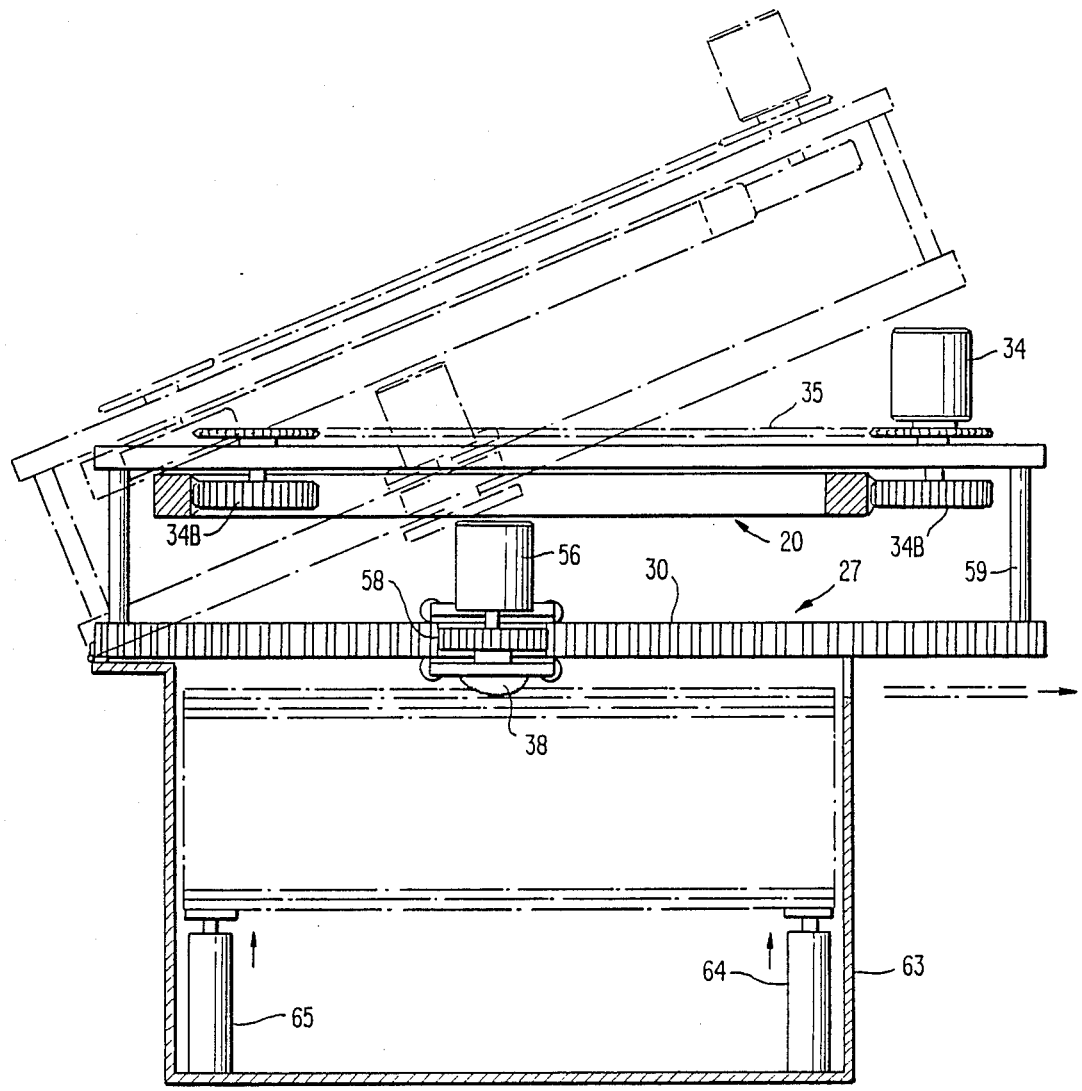
FIG. 14, is a vertical sectional view of the primary and secondary frame members of the measurer of the present invention mounted on a supply container for a vertical stack of sheetrock panels to be cut resting upon an incrementally elevatable ram system to advance sheets upwardly one half of an inch to be measured and cut and showing the primary and secondary frames to be tiltable to remove measured and cut panels of sheetrock for installation.

As shown in FIG. 14 the primary and secondary frames 20, 27, may be mounted on a sheetrock supply container 63, to be pivotally raised at one side to remove a panel of sheetrock which has been cut to size for installation.

The bottom of the container may be provided with indexing elevatable hydraulic cylinders 64, 65, to raise the stack of sheetrock in container 63 one half inch, as each panel has been cut to size.

This machine of the present invention measures and cuts sheetrock to fit both walls and ceilings, FIGS. 1 and 2, show the part of the machine C, which cuts the sheetrock. FIG. 1, shows a top perspective of the machine and FIG. 2 shows a top plan view of FIG. 1.

FIG. 3, shows the side view of the machine of FIG. 2, as positioned over a stack of sheetrock panels.

The frame shown in FIG. 1, is 10 feet long. The cross racks are exactly 4 feet long, the same as the width of a panel of sheetrock and there are pieces that extend to touch the stud or joist on the measuring unit to ensure that the measurement is exact. A measurement can be made anywhere on the walls or ceilings within an area of 4 feet by 8 feet and cuts can be made anywhere on 4×8 panel of sheetrock.

Figure 11:
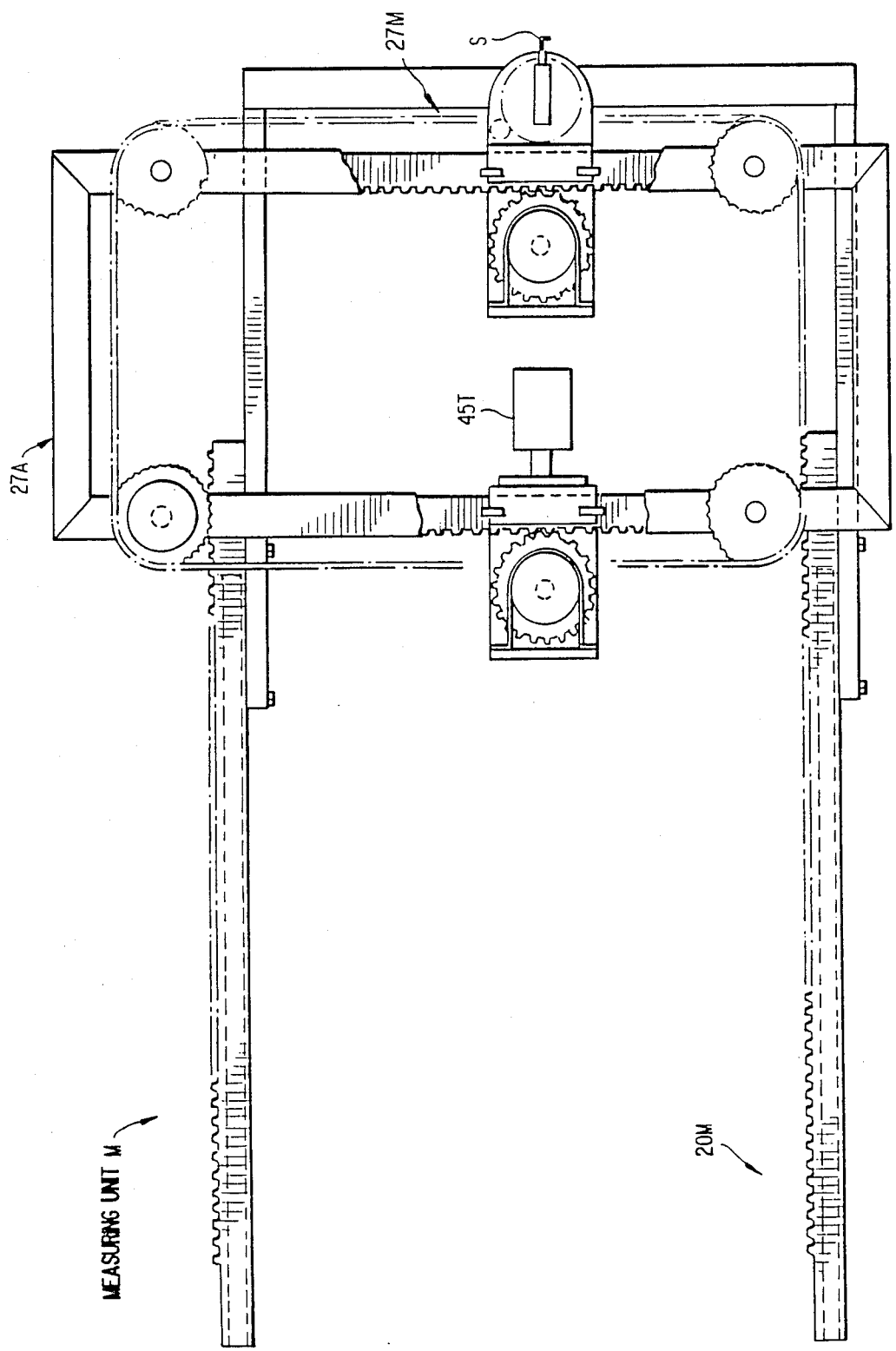
FIG. 11, is a top plan view of the measuring unit constructed in accordance with the present invention showing its variable length adjustability.

All of the circular gears, cross racks, brackets that connect them and corresponding motors of FIGS. 1 and 11, are identical in size and weight. All devices to mark and corresponding devices to cut are of the same weight. The motors on the long racks in FIGS. 1 and 11, are larger than those on the cross racks in FIGS. 1 and 11, but all corresponding motors are of identical size, horsepower and run at the same speed. Because of the facts stated herein before, any distance of a movement made in FIG. 11 the stylus S or measurer M will be equal to the distance of a movement made by the cutter C, circular saw 38 of FIG. 1, which is done simultaneously.

Figure 15:
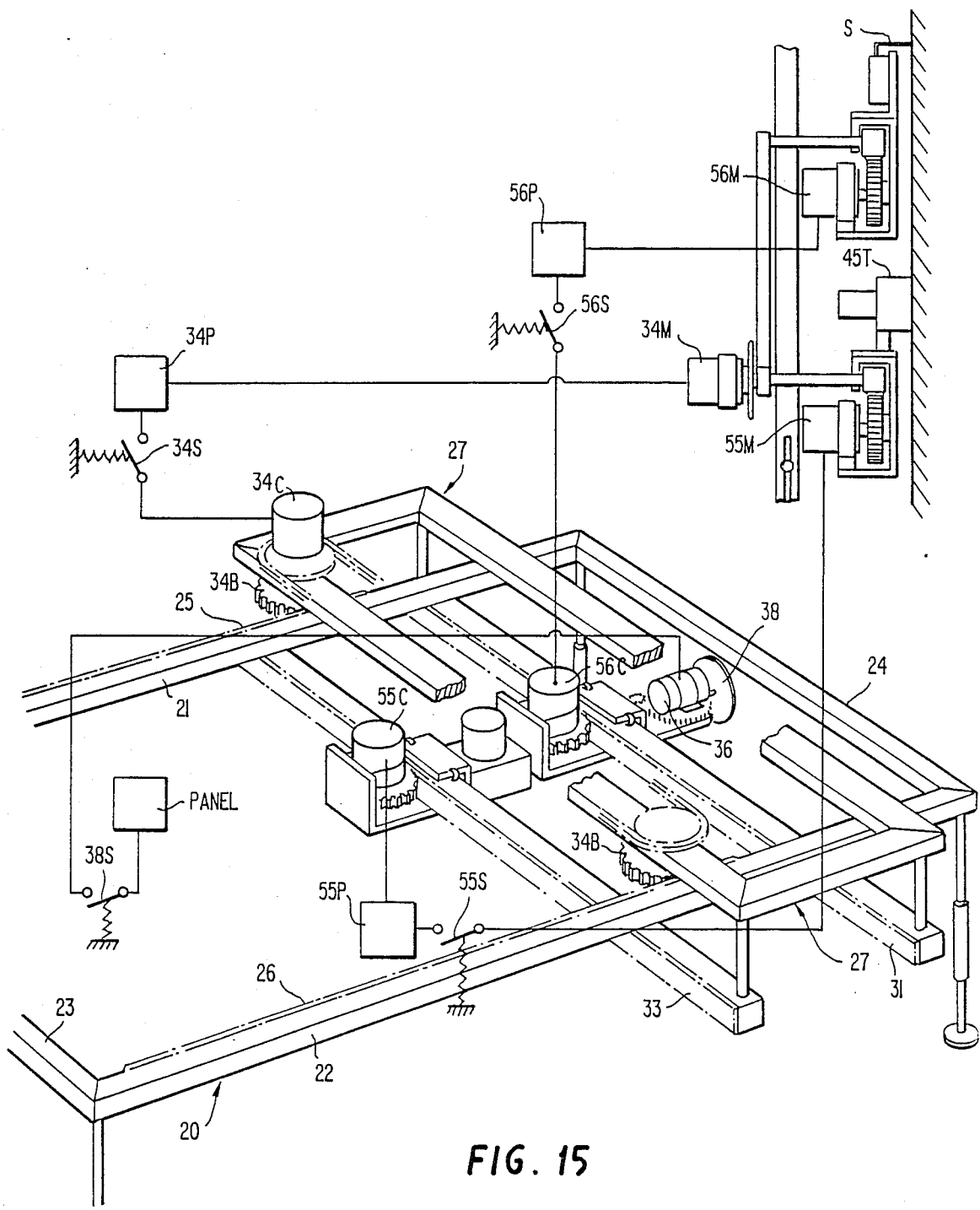
FIG. 15, is a fragmentary perspective schematic view with parts broken away and parts shown in section of the measuring and cutting units with the electrical schematic superimposed thereon.
Figure 16:
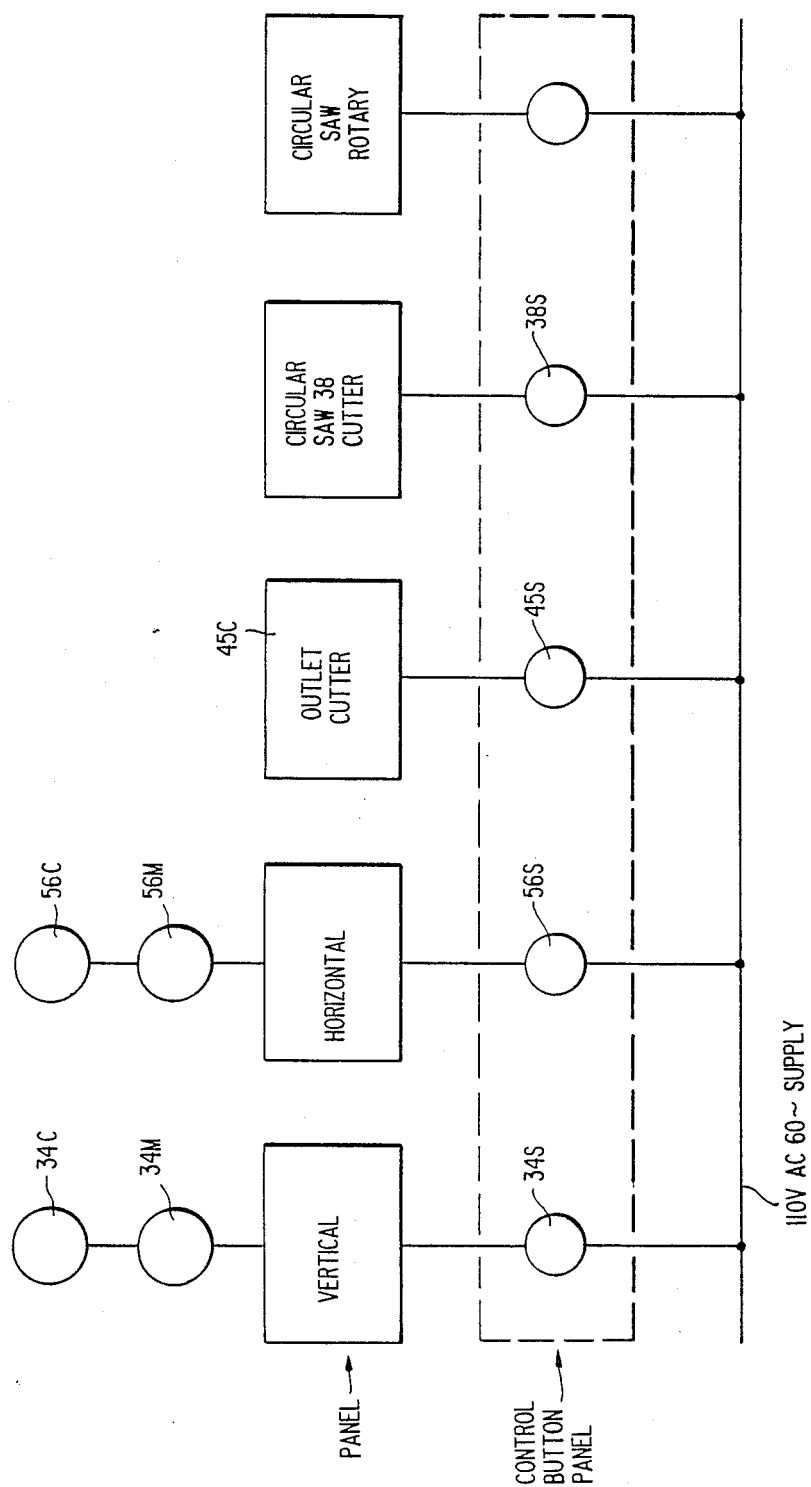
FIG. 16, is a panel switch and power layout for controlling the apparatus of FIGS. 1 through 16.

As shown in FIGS. 15 and 16 the measurer M and cutter C, may be actuated from the same control panel 70. When a movement is made by the measurer M exact duplicate movement is made simultaneously by the cutter C.

Figure 12A:
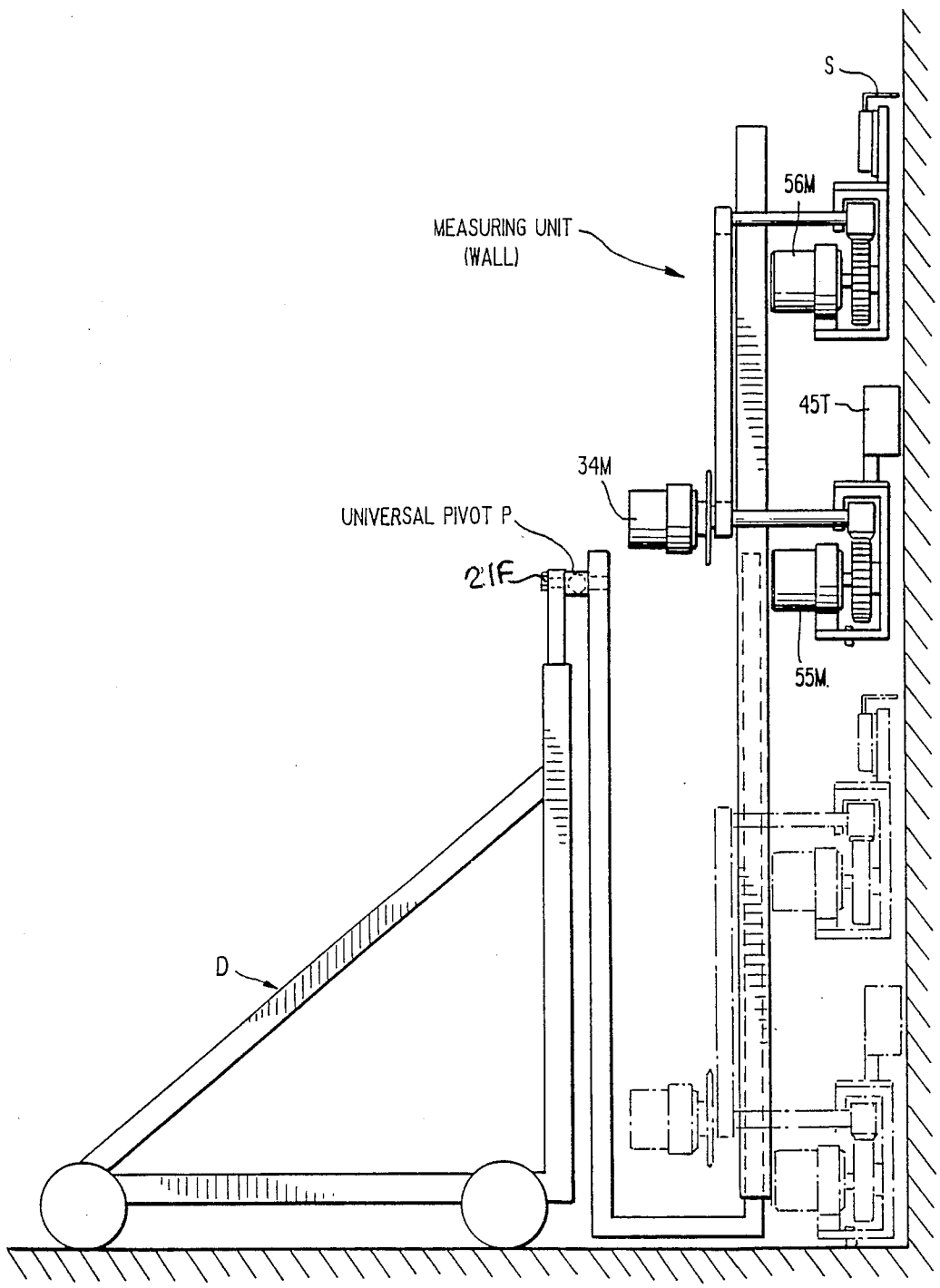
FIG. 12A, is a vertical side elevational view of the sheetrock wall measuring device shown measuring the vertical height of a panel of sheetrock having parts broken away and parts shown in dash line with the measuring unit in a fully raised condition and the measuring device shown in its fully lowered condition in chain lines.

An example of this is when the device to mark where sheetrock is to be cut in FIG. 12A, the measurer M, stylus S is moved and an exact duplicate movement is made by the cutter device while cutting a panel of sheetrock in FIG. 1.

The pieces in each corner of the frame FIG. 4, extends down to insure that the frame is close enough to the top sheet of sheetrock, in the stack of sheetrock for a cut to be made.

The 4 legs that support the frame may each be adjusted upwardly or downwardly as needed.

Figure 12B:
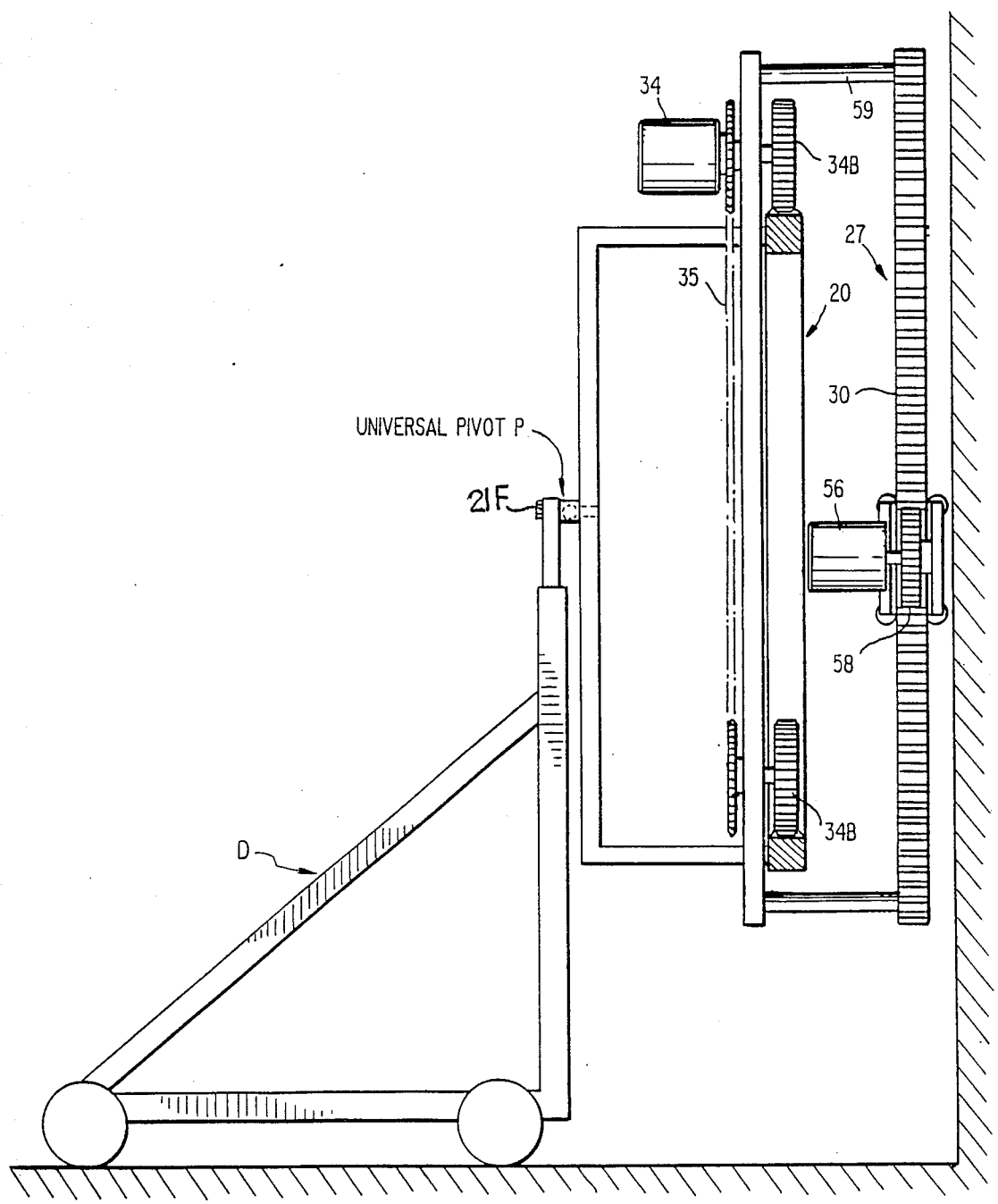
FIG. 12B, is a view similar to FIG. 12A with the measuring device shown rotated about the universal pivot for measuring at a right angle to the major axis of the wall being measured.
Figure 13:
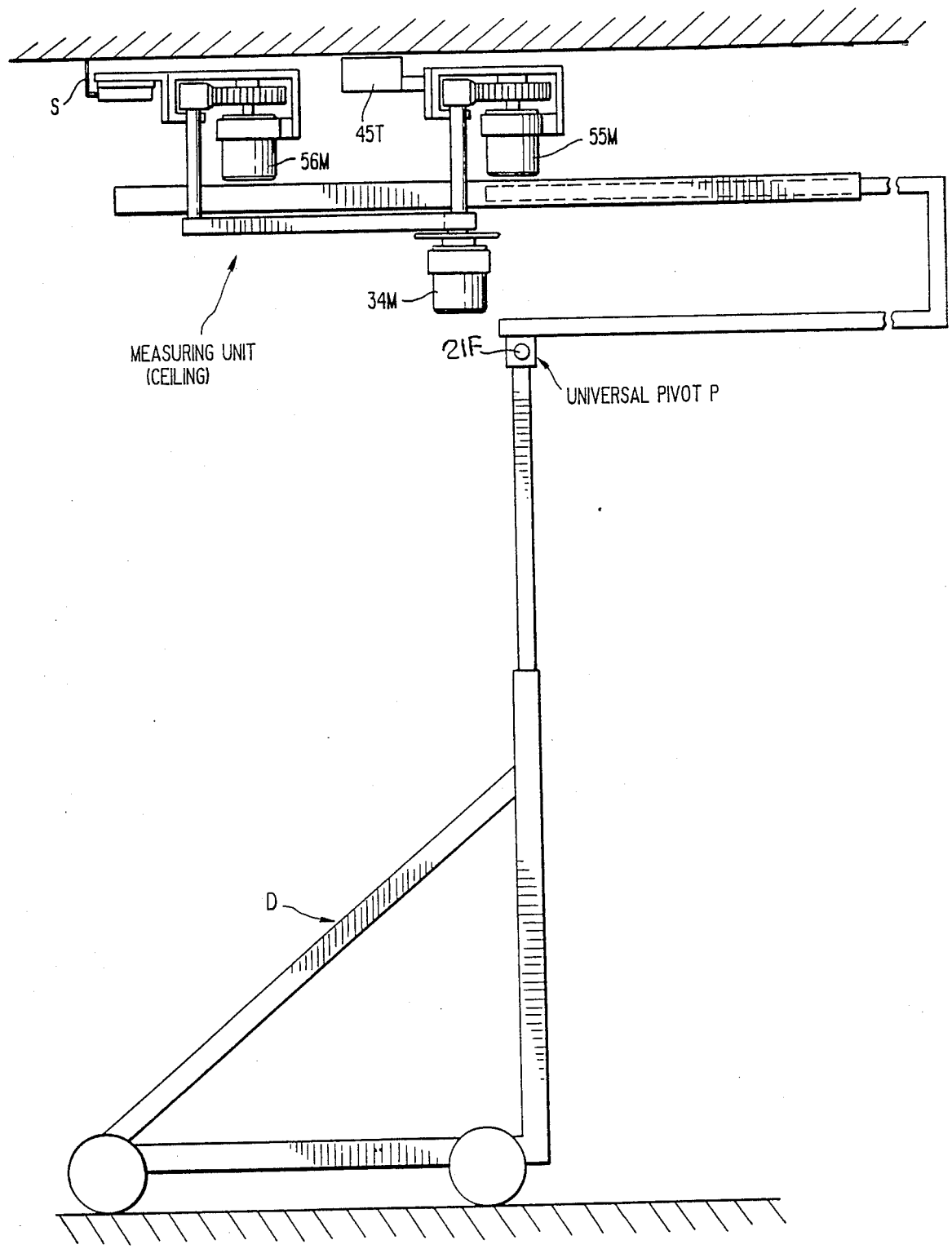
FIG. 13, is a side elevational view of the measuring device of FIG. 12A with the measuring unit swung ninety degrees about the universal pivot for measuring the ceiling to cut sheetrock for hanging thereon.

Referring now to FIG. 16, an electrical schematic is shown for electrically tieing the wall and ceiling measuring unit M of FIGS. 11 through 13, to the sheetrock cutter C of FIGS. 1 through 4. The two motors 34M and 34C have an electric supply control panel 34P under control of a single switch 34 S which causes the measuring control stylus S of measurer M and circular cutter saw 38, of cutter C to be moved in sync in an up or down motion along the primary frame 20. The major axis of both the measurer M and cutter C units being within 8 feet, so that the stylus S may trace the wall path of a panel of sheetrock, to be cut to permit the motor 34 S on the cutting unit to travel a distance long enough to cut an 8 foot piece of sheetrock length a full 8 feet.

The cutter saw 38 on the cutter frame C which will make the measured cut on a panel of sheetrock at the top of a stack of sheetrock, beneath the cutter frame C, of FIGS. 1 and 2, as shown in FIGS. 3 and 4. The motors 34M and 34C are controlled by a normally open switch 34S which when closed will simultaneously energize both motors to move the secondary frame of both the measurer M and cutter C, the same distance up or down along the long racks or primary frame so that the cutter blade 38 and the measuring stylus S will have moved the same distance along the major axis of each frame.

Now to measure transversely of the room wall or a sheet of sheetrock to be cut the motors 56M and 56C which are tied together and operated by a single switch 56S biased to a normally open switch position which when closed will simultaneously, energize both motors causing the measuring stylus S and the sheetrock cutter 38 to be moved transversely cutting the sheetrock to its correct vertical height.

When it is desired to cut out a portion of the sheetrock for an electrical outlet panel the box panel cutter 45 of FIGS. 8, 9 and 10 is placed upon the positioning block 45T whose transvers path is controlled by motors 55M and 55C which are tied together and operated by a single switch 55S baised to a normally open switch position which when closed will simultaneously energize both motors causing the measuring stylus block of the measuring unit and the box panel cutter of FIGS. 8, 9 and 10 to be moved a corresponding distance to cut the panel of sheetrock exactly where desired.

All of the control buttons may be mounted on a single panel.

As best seen in FIGS. 12a, 12b, 13, a mobile frame for the measuring unit is a wheeled dolly D which has pivotally mounted split U-shaped vertical forked frames 21A, 21B. As best seen in FIG. 13A, the upper ends of one leg 21C, 21D, of each U-shape frame are joined by a cross member 21E which is pivotally mounted to the wheeled dollies at 21F, FIG. 12B, for swinging the forked frames between a vertical (FIG. 12A) and horizontal (FIG. 12B) position to either measure and cut ceiling or wall sheetrock panels. The U-shaped forked frames 21A and 21B have receivable thereover telescopic gear rack sleeves 25A, 26A so that the secondary rectangular frames 27A may traverse the full length of the panel being cut and the secondary frame shown in FIG. 11 will traverse the full length of the panel being cut. The legs 21H and 21G connected by the bottom 21H and 21G and being free at their upper ends are receivable within gear rack sleeves 25A, 26A for driving the secondary frames 27A to measure the sheetrock as dictated by the measuring scribe S. The inside cross sectional area of the sleeves 25A, 26A are complemental to the cross section of the arms 21G, 21H of the U-shaped split vertical forked frames 21A, 21B without twisting, to permit the sleeves 25A, 26A to slide axially along the arms 21G, 21H. This permits cutting of the full length of a standard sheet of sheetrock which is 4 feet × 8 feet. The primary frame of the cutter unit must be 10 feet long to permit the secondary frame to traverse the maximum length of the sheet so that the cutting saw will cut the full 8 feet of the sheet.

The cross section of the legs of the U-shaped split frames may be circular or rectangular and the hollow gear rack sleeves having external gear teeth must be geometrically similar to in cross section to axially pass over the legs of the U-shaped split frame so that the gears 34 B driven by motor 34 can properly position the secondary frame 27 so that the circular saw blade 38 will cut the sheetrock at any point up to its extremity either lengthwise or widthwise over its length or width without being blocked out by either the primary or secondary frame blocking saw traverse as dictated in following stylus measurements.

There is no primary rectangular frame for the measuring unit similar to the cutting unit. There are two long gear rack sleeves which are six feet long which are hollow inside from one end for a distance of approximately four feet to receive therein the two prongs of the U-shape fork as shown in FIG. 13A which fits into these hollow places as shown in FIGS. 12A, 12B and 13.

The secondary frame of the measuring unit is different from the secondary frame of the cutting unit in that there are four round gears 34B on the measuring unit as best seen in FIG. 11 compared to two round gears on the cutting unit of FIG. 1. The two extra round gears are in the upper top part of the secondary frame. All four gears are connected by a chain as shown in FIG. 11. The two extra top gears are necessary so that when the secondary frame moved down the two racks as far as possible (a piece connected to the secondary frame is touching the floor as shown in FIG. 12A) then the racks start moving up. The two upper gears permit the racks to move up high enough, as shown in FIG. 12A to keep the master motor 34M on the measuring unit running long enough to permit the motor 34C on the cutting unit to run a distance long enough to cut an 8 feet piece of sheetrock length a full 8 feet.

The pieces that are extended toward the wall on the . upper part of the secondary frame of the measuring unit and the U-shaped fork are indicators to be placed in the corner or against the edge of the last piece of sheetrock that was hung to assure proper measurement.

The measuring unit can be rotated at a 90° degree angle so that sheetrock can be hung horizontal instead of vertical as shown in FIG. 12B.

The U-shape fork is used to connect the measuring unit with the dolly or wheeled vehicle as shown in FIGS. 12A, 12B and 13.

IN OPERATION

Normally open switch 71 is closed simultaneously energizing motors 34M and 34C which causes both secondary frame 27 on the measurer frame M and the cutter frame C, to move over the long rack and primary frames 20M and 20C respectively, so that the cutter 38 on the cutter frame C will follow the vertical movement of the stylus S on the measurer frame M when the motor 34 is energized by switch 72 the cutter will cut the panel as indicated by the stylus S.

When stylus S is to be moved horizontally, normally open switch 73 is closed in power circuit panel 74 energizing both motors 56M and 56C to move both the stylus S of frame M and cutter blade 38, of frame C, to out a panel positioned under saw 38, as directed by the stylus S.

When an electrical outlet opening is to be cut in the panel the outlet box positioning template marker 45T, is positioned by placing the box 45T of the measuring unit at the wall position which will cause motor 55, when energized by closing normally open switch 55S through power panel 76 to energize motor 55C and 55M driving pinions 32M and 32C to position the cutter box 45 over the panel to be cut and when normally open switch 77 is closed as shown in FIGS. 8, 9 and 10 the rectangular cut out on the panel beneath the cutting unit 45 will be cut.

The horizontal position of the outlet cutter 45, is controlled by motor 55M and 55C and the vertical position of the cutter box is controlled by motors 34M and 34C, which elevates or lowers the secondary frame 27M or 27C. Each saw unit 38 and 45 has its own normally open control switch operating through a power panel to connect a sourse of line power to the cutter saws as shown in FIGS. 5 and 8.

What I claim is:

1. An apparatus for simultaneously measuring the walls and ceilings of an area to be paneled with sheetrock and cutting 4×8 panels of sheetrock for installation comprising, a measuring unit having a stylus supported thereon for both vertical and horizontal movement to trace out the outline of a panel of sheetrock to be cut directly from the wall upon which the panel is to be installed, a cutting unit having sawing means mounted thereon for both vertical and horizontal movement positionable over a stack of 4×8 sheetrock panels and including drive means for said sawing means and electrical control means connected between said measuring unit and said sawing means drive means to direct said sawing means of said cutting unit to cut panels of sheetrock as outlined by the measuring stylus of said measuring unit simultaneously with the path traced by the measuring stylus on said measuring unit, said measuring unit comprising a pair of U-shaped frames connected at the top inner ends of said U-shape by a cross member having a universal pivot for swing mounting said U-shaped frames of the measuring unit to a wheeled floor carrier for either vertical or horizontal movement to measure directly from either wall or ceiling to direct the sawing means of the cutting means to follow the pattern outlined by the stylus of said measuring means, sleeves carried by the outer free ends of said U-shaped frames having external gear teeth on each sleeve to permit driving of the secondary rectangular frame therealong, and a secondary rectangular frame being mounted with its major axis transverse to the vertical axis of the U-shaped frames of the measuring unit on which said stylus is carried.

2. An apparatus for simultaneously measuring and cutting 4×8 panels of sheetrock comprising, a measuring unit comprising a stylus supported thereon for both vertical and horizontal movement to trace out the outline of a panel of sheetrock to be cut directly from the wall upon which the panel is to be installed, said measuring unit comprising a split U-shaped vertical forked frame the upper ends of one leg of each U-shape being joined by a cross member for swing mounting said frame to a wheeled floor carrier for either vertical or horizontal placement of the U-shape, gear rack sleeves telescopically receivable over the free end of one of each of the legs of each U-shape to be movable along the free arm of each U-shape vertical forked frame to permit measuring of up to a full length of a sheet of sheetrock, a secondary rectangular frame being mounted with its major axis transverse to the vertical axis of the U-shape vertical forked frame of said measuring unit, electrical means connected to drive said secondary frame along the major axis of said U-shape vertical forked frame of said measuring unit, said measuring stylus being carried by said secondary frame and being electrically driven along the longitudinal axis of said secondary frame to trace out the dimensions of the panel of sheetrock to be cut, a cutting unit having sawing means mounted thereon for both vertical and horizontal movement positionable over a stack of 4×8 sheetrock panels and including drive means for said sawing means, and electrical control means connecting said measuring unit to said sawing means drive means so that said sawing means of said cutting unit cuts a 4×8 panel of sheetrock both vertically and horizontally as outlined by the stylus of the measuring unit.

3. An apparatus for simultaneously measuring and cutting 4×8 panels of sheetrock comprising, a measuring unit having a primary rectangular frame, a stylus supported thereon for both vertical and horizontal movement and including means enabling said primary frame to be movable along the floor to trace out the outline of a panel of sheetrock to be cut directly from the wall or ceiling upon which the panel is to be installed, a secondary rectangular frame mounted with its major axis transverse to the vertical axis of the primary frame and said measuring unit and being movable therealong, a cutting unit having plural sawing means mounted thereon and including sawing drive means for moving said plural sawing means in both vertical and horizontal directions, said cutting unit being positionable over a stack of 4×8 sheetrock panels, and electrical control means responsive to the movement of the stylus to effect control of said sawing drive means so that the saws of said sawing means of said cutting unit are directed to cut 4×8 panels of sheetrock vertically and horizontally as outlined by the stylus of said measuring unit, and said measuring stylus being carried by said secondary frame of said measuring unit which traces out the dimensions of the panel of sheetrock to be cut.

4. An apparatus for simultaneously measuring the walls and ceiling of an area to be paneled with sheetrock and cutting 4×8 panels of sheetrock for installation comprising a physically independent measuring unit having a stylus supported thereon for both vertical and horizontal movement to trace out the outline of a panel of sheetrock to be cut directly from the wall or ceiling upon which the panel is to be installed, said measuring unit comprising support structure including a primary longitudinal frame having means on the base thereof to enable said primary frame to be movable along the floor, a transverse frame mounted on said primary frame and movable at a right angle to the major axis of said primary frame said stylus being mounted on said secondary frame, and means for pivotally mounting said measuring unit for swinging the measuring unit between vertical and horizontal alignment for positioning said measuring unit against either said wall or ceiling being measured, said support structure for the measuring unit being movable along the floor, a physically separate cutting unit having electrically driven saw means including saw drive means for moving said saw means for both vertical and horizontal movement, and electrical control means responsive to movement of the stylus to effect control of the saw drive means to produce sheetrock panels as directed by the stylus.

5. The apparatus of claim 3 wherein one of said plural sawing means is a rectangular saw box having four saw blades mounted in said box for horizontal reciprocation by a motor driven cam to cut a rectangular hole through the sheetrock beneath said rectangular saw box for installing electrical outlets in said sheetrock panels.

6. An apparatus as claimed in claim 3, wherein said cutting unit comprises a closed primary frame, a closed secondary rectangular frame mounted with its major axis transverse to the vertical axis of said primary frame, a said sawing means comprising a circular saw blade and carried by said secondary frame and positioned to cut the top sheetrock panel of said vertical stack of panels to the dimensions traced out by the measuring stylus of the measuring unit, said sawing means being mounted on said secondary rectangular frame carried by said closed primary frame for movement of the plane of the circular saw blade through an angle range of 0° to 90° to cut a panel of sheetrock either normal to its major axis or parallel to its major axis, said sawing means saw blade following the positioning of the stylus of said measuring unit.

7. The apparatus of claim 6, wherein said sawing means includes a rectangular saw for cutting electrical outlets in the panel of sheetrock.

8. The apparatus of claim 6, wherein said sawing means includes a circular cup-shaped saw for cutting circular openings through the sheetrock panel for plumbing lines to pass through the panel.

* * * * *